Patented June 29, 1954

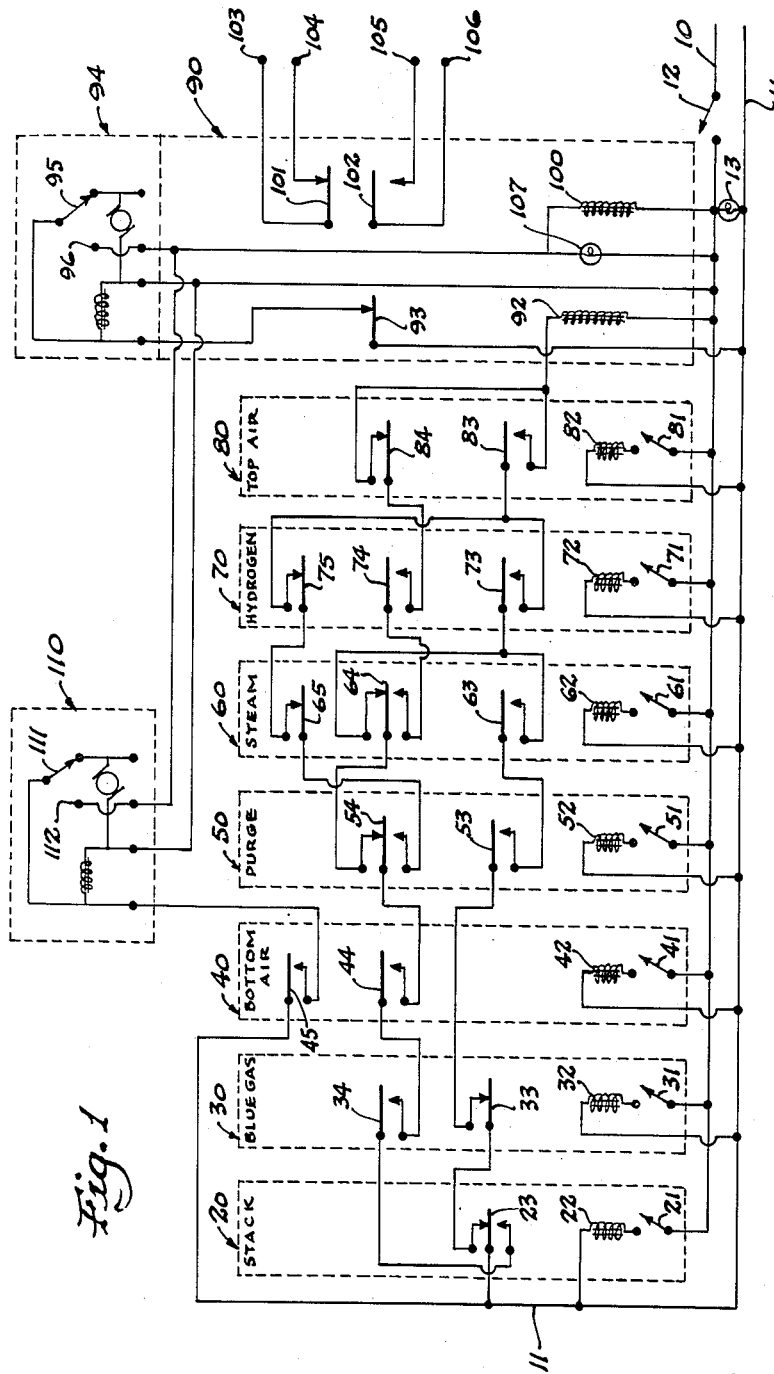

2,682,653

UNITED STATES PATENT OFFICE 2,682,653

SUPERVISORY SIGNAL AND CONTROL SYSTEM FOR HYDROGEN GENERATORS

Le Roy Clardy, Chicago, Ill., assignor to Swift & Company, Chicago, Ill., a corporation of Illinois Application November 15, 1949, Serial No. 127,486

8 Claims. (Cl. 340—238)

The present invention relates to a gas generator and is directed to an apparatus to report the existence of a malfunction in the operation of the valves of that device.

In the operation of a hydrogen generator of the type where steam is passed over hot iron a cyclical procedure is followed, which procedure is made up of a number of individual steps. Each of these steps is initiated by the closing and opening of certain of the valves to set up an "acceptable" or proper valve combination for that step. In some plants the mechanism to close or open the proper valves is initiated by a human operator while in other installations, the initiating operator is a clock-type mechanism which directs the setting of the valves in a timed sequence. The mechanism which moves the valves and which is directed by the operator may be of various types with the motive force usually being a fluid or electricity. Similar procedures are followed in the case of other gas generators; as for example, a water gas or blue gas generator.

The opening or closing of the wrong valves may set up an explosive condition and, for this reason, the mechanism for actually moving the valves, whether it be directed by a human operator or a mechanical operator, is interlocked to prevent the movement of certain valves when other valves are in such a position that the movement of said certain valves would produce an unsafe combination. Despite this wise precaution, it is still possible to set up an improper valve combination which, although not unsafe, is such that it will cause improper operation and pollution of the produced hydrogen gas. Often the setting up of such an improper combination is due to the malfunction of a valve caused by its sticking in open or closed position, even though the operator has issued the required order to move the valve to its proper position. Unless the interlocking system is such as to be responsive to the movement of the valves rather than to the orders given to the valves, it also would be possible for a sticking valve to produce an unsafe valve combination.

The principal object of the present invention is to provide an apparatus for reporting back to the initiating operator, whether it be a human or clock-type mechanism, the fact that a malfunction in a valve has occurred to produce an improper valve combination. The invention may also be used to shut down the plant in addition to merely signaling the existence of the malfunction.

A further object is to furnish such a report if the valves have not assumed the setting for an acceptable combination within a given period of time. In some instances, a human operator will be tardy about performing the necessary operations to initiate the valve movements to move from one step of the cycle to the next. During this period of delay it may be possible to produce impure gas, thus polluting the gas already in storage, or at least to slow down the desired output of the plant. Through the use of the present invention a report will be made should a delay occur of greater duration than that reasonably required to change the valves from one step to the next.

Other objects and advantages include: an apparatus that is reasonable in initial cost; an apparatus which has little wear and will require a minimum for cost of maintenance and repairs; and an apparatus which may be readily adjusted to meet changes in the timing of the individual steps or operating cycle.

Additional objects and advantages will become apparent from the following description taken in conjunction with the drawings in which:

Fig. 1 is a schematic diagram of an embodiment of the present invention; and

Fig. 2 is a chart showing the valve positions for the various steps of the cycle of a hydrogen generator of the type with which the embodiment of Fig. 1 is to be used.

The embodiment of Fig. 1 is adapted for use with a Bamag type hydrogen generator, a type well known in the art. A description of such a generator will be found on page 596 et seq. of "Oil and Fat Products" (1945) by A. E. Bailey, the disclosure of which is incorporated herein by reference. Any well known type of mechanical operator may be used therewith as for example that disclosed in Patent No. 1,184,692, the disclosure of which is incorporated herein by reference.

In the hydrogen generator referred to five steps are included in an operating cycle, after which the steps repeat for the next cycle. Seven control valves are used and these valves are set in different positions to produce a different acceptable valve combination for each of the five steps.

In the present invention a separate switch is operated by the opening or closing of each valve, with each of the seven switches so wired together in series that a closed series circuit will be formed through the seven switches if the valves are in an acceptable combination, while if an unacceptable valve combination is produced, either by the sticking of a valve or by misdirection, the series circuit will be opened. An indicating mechanism is then used to sample the circuit to determine whether or not it is open or closed, thus advising whether an unacceptable or an acceptable combination exists.

I have discovered that for each change from one step to another, with one exception, at least two valves change position, and have devised a switch circuit in which the switches are arranged in an order to take advantage of this fact to produce four electrical paths through the chain of multiple contact switches. Any of the five acceptable combinations or valve settings will so position the switches that a closed series circuit is formed along one of these four paths between the two end switches of the chain. Any combination of switch settings other than that corresponding to an acceptable valve combination will open the circuit between the two end switches of the chain.

In each case, with one exception, at least two switches must be moved to change from one acceptable path to any other acceptable path. Since it is extremely unlikely that a malfunction of more than one valve will occur at a time, there is little possibility that a change will be made from one acceptable combination to any other than the next acceptable combination.

In moving from the first to the second acceptable combinations only one valve changes position and, except during step two, this valve remains closed (the bottom air valve in Fig. 2). The closing of this air valve at the end of step 2 is detected by the series circuit in the same manner as is the proper movement of the remaining valves ascertained. To detect the opening of this valve at the proper time I use a timing arrangement which will provide a warning if the valve does not take its required position.

The switches actually moved by the valves may be any of a well known type and preferably are connected to the valves by a lost motion mechanism so that the switch does not change position except upon the movement of the valve into a fully closed or fully open position. In the embodiment illustrated the switch mechanisms are a composite of an individual valve switch and a relay. This is purely for the purposes of convenience in producing a compact unit in which the major parts and wiring are readily accessible as a group for servicing. It will be apparent to those skilled in the art that the individual switches, plus the associated relay, may be replaced by a multiple contact switch without the relay. The term "switch mechanism" is used herein to designate the composite assemblage of the individual switches operated by the valves plus the relays controlled by the individual switches.

Referring to Fig. 1, the seven switch mechanisms are designated by the numbers 20, 30, 40, 50, 60, 70, and 80, and correspond and are responsive to the stack, blue gas, bottom air, purge, steam, hydrogen, and top air valves, respectively. The number 90 designates the indicating apparatus used to determine whether or not a closed series circuit exists through the seven switch mechanisms.

Power lines 10 and 11 lead to a suitable source of electrical energy and a main switch 12 in line 10 controls the operation of the device. Preferably, a pilot light 13 is used to indicate whether or not the device is energized.

Seven individual switches 21, 31, 41, 51, 61, 71, and 81, respectively, in series with coils 22, 32, 42, 52, 62, 72, and 82, respectively, are connected in parallel across supply lines 10 and 11.

Starting at the left side of Fig. 1 at the stack valve switch mechanism and working through to the right to the top air valve switch mechanism, it will be seen that there are four possible circuits through the armatures and the associated contacts of the various relays. A single series circuit is used to check for both acceptable positions 1 and 2 (see Fig. 2) making four closed series circuits for the five acceptable positions. The only difference between acceptable position 1 and acceptable position 2 of Fig. 2 is the movement of the bottom air valve from a closed to an open position and a timing mechanism is used to check the movement of this valve at the proper time.

Briefly the wiring through the relays is as follows: Armature 23 is connected to power line 11. The normally closed contact of armature 23 is connected to armature 33 and the normally open contact of armature 23 is connected to armature 34. The normally closed contact of armature 33 by-passes the bottom air valve switch mechanism (an armature and contact could be used here but would be of little value) and is connected to armature 53 of the purge valve switch mechanism. The normally open contact of armature 44 is connected to armature 54. The normally closed contact of armature 54 is connected to armature 64 while the normally open contact of armature 54 is connected to armature 65. The normally open contact of armature 53 is connected to armature 63. The normally open contact of armature 63 is connected to armature 73 as is the normally closed contact of armature 64. The normally open contact of armature 64 is connected to armature 74. The normally closed contact of armature 65 is connected to armature 75. The normally open contact of armature 73 and the normally closed contact of armature 75 are connected to armature 83. The normally open contact of armature 74 is connected to armature 84. The normally closed contact of armature 84 and the normally open contact of armature 83 is connected to power line 10 through relay coil 92 of the indicating apparatus.

The armatures are all shown in the normal position which corresponds to the respective individual switches 21, 31, etc., being open and to the open position of the respective valves.

The four electrical paths through the seven switch mechanisms are as follows and correspond to the position of the valves as shown in Fig. 2:

*Acceptable positions 1 and 2*

The circuit is from power line 11 through armature 23, armature 33, armature 53, armature 63, armature 73, and armature 83 to power line 10.

*Acceptable position 3*

The circuit is from power line 11 through armature 23, armature 34, armature 44, armature 54, armature 64, armature 73, and armature 83 to power line 10.

*Acceptable position 4*

The circuit is from power line 11 through armature 23, armature 34, armature 44, armature 54, armature 65, armature 75, and armature 83 to power line 10.

*Acceptable position 5*

The circuit is from power line 11 through armature 23, armature 34, armature 44, armature 54, armature 64, armature 74, and armature 84 to power line 10.

A study of the foregoing four circuits will reveal that should any one valve fail to change and move the respective switch when the change is made from one acceptable position to the next, the series circuit through the chain will not be made.

It also will be apparent that the foregoing four series circuits fail to distinguish between acceptable positions 1 and 2. In other words, should the bottom air valve fail to open at the proper time in going from acceptable position 1 to acceptable position 2, it would not be detected. This failure is detected by timer 110 controlled through armature 45 responsive to the movement of the bottom air valve.

In going from acceptable position 2 to acceptable position 3 the bottom air valve is closed bringing armature 45 against its respective contact and closing a circuit through the timer 110 between power lines 10 and power lines 11. If the valve does not close, the failure of armature 44 to close will signal a malfunction. The timer is started running and has been set so that switch arm 111 will be moved to contact 112 shortly after the length of time that it normally takes for the cycle of the hydrogen generator to return to the point where the bottom air valve should open between steps 1 and 2. If the bottom air valve opens as it should, armature 45 will break the circuit through timer 110 and allow the spring return in the timer 110 to reset the timer. If the bottom air valve does not open at the proper time, arm 111 will shortly thereafter be moved to contact 112 closing the circuit through relay coil 100 of indicating apparatus 90 to signal (as hereinafter described) the failure of the hydrogen generator to function correctly.

Included in indicating apparatus 90 is a timer 94 energized through relay armature 93 in response to the de-energization of coil 92. As long as a closed circuit is maintained through the switch mechanism the relay coil 92 is energized holding armature 93 away from its contact. When the series circuit is broken coil 92 releases armature 93 closing the circuit from the power lines through timer 94. If the timer motor runs for the full length of time for which the setting has been made, arm 95 will be moved to contact 96 at the end of the period, stopping the timer and making a connection through coil 100 to signal the existence of an open circuit.

Timer 94 is set so that arm 95 will not be moved to contact 96 until after a sufficient length of time has elapsed normally to enable the valves to reestablish an acceptable position and to close a series circuit through one of the four paths through the switch mechanisms and coil 92. If such a closed circuit is established within the given period of time, armature 93 breaks the circuit through the timer and arm 95 resets with a spring in a well known manner.

A signal light 107 may be used in parallel with coil 100 to signal the existence of a malfunction when the circuit is closed by either timer 94 or timer 110. Armatures 101 and 102 responsive to coil 100 may be used to control other circuits as desired. For example, normally closed circuit through armature 101 may be connected in series, through binding posts 103 and 104, with the power supply to the mechanical operator for the hydrogen generator. If a malfunction of the valves should occur, coil 100 will be energized and armature 101 will break the power circuit to shut down the hydrogen generator. The normally open circuit through armature 102 may be connected, through binding posts 105 and 106, to any desired alarm system or recording apparatus.

The foregoing description of a specific embodiment is for the purpose of compliance with 35 U. S. C. 112 and should not be construed as imposing unnecessary limitations on the appended claims. Such obvious modifications as substituting a pair of switches operatable at the top and bottom of the valve stroke, respectively, together with locking relays in place of the lost motion switches and ordinary relays as illustrated and described may be made without departing from the spirit of the invention.

I claim:

1. For use with a gas generator having a plurality of control valves which are opened and closed in a plurality of acceptable combinations during an operating cycle, a plurality of switch mechanisms, each switch mechanism corresponding to one of the control valves and responsive thereto, said switch mechanisms being wired together to form a closed series circuit therethrough only when said valves are positioned in an acceptable combination and to form an open circuit when said valves are in any unacceptable combination, and means to indicate whether said circuit is closed or open, thus indicating the presence of an acceptable or an unacceptable combination.

2. For use with a gas generator having a plurality of control valves which are opened and closed in a plurality of acceptable combinations during an operating cycle, a plurality of multiple contact switch mechanisms, each switch mechanism corresponding to one of the control valves and responsive thereto, said switch mechanisms being wired together to form a closed series circuit through said switch mechanisms only when said valves are positioned in an acceptable combination and to form an open circuit when said valves are in any unacceptable combination, means to indicate whether said circuit is closed or open, thus indicating the presence of an acceptable or an unacceptable combination, and timer means to cause said last named means to indicate a closed circuit until after an open circuit has existed for a predetermined length of time.

3. For use with a hydrogen generator having a steam valve, a hydrogen valve, a purge valve, a bottom air valve, a top air valve, a blue gas valve, and a stack valve which are operated in a given sequence through a series of acceptable combinations to produce an operating cycle, a device to determine the existence of an acceptable combination including a switch mechanism for each of said valves, each of said switch mechanisms being responsive to the opening and closing of the respective valve, said switch mechanisms being wired in series beginning with the stack valve switch mechanism and ending with the top air valve switch mechanism, said switch mechanism and said wiring being such that for any acceptable combination a closed circuit is made from the stack valve switch mechanism to the top air valve switch mechanism while said circuit is open if any unacceptable combination is set up, and indicator means connected to the stack valve switch mechanism and to the top air valve switch mechanism to signal the existence of an unacceptable combination.

4. For use with a hydrogen generator having a steam valve, a hydrogen valve, a purge valve, a bottom air valve, a top air valve, a blue gas valve, and a stack valve which are operated in a given sequence through a series of acceptable combinations to produce an operating cycle, a device to determine the existence of an acceptable combination including a switch mechanism for each of said valves, each of said switch mechanisms being responsive to the opening and closing of the respective valve, said switch mechanisms being wired in series beginning with the stack valve switch mechanism and ending with the top air valve switch mechanism, said switch mechanisms and said wiring being such that for any acceptable combination a closed circuit is made from the stack valve switch mechanism to the top air valve switch mechanism while said circuit is open if any unacceptable combination is set up, and indicator means connected to the stack valve switch mechanism and to the top air valve switch mechanism to signal the existence of an unacceptable combination, said indicator means including a timer to delay the signaling of an unacceptable combination until it has existed for a predetermined period of time.

5. For use with a hydrogen generator having a steam valve, a hydrogen valve, a purge valve, a bottom air valve, a top air valve, a blue gas valve, and a stack valve which are operated in a given sequence through a series of acceptable combinations to produce an operating cycle, a device to determine the existence of an acceptable combination including a switch mechanism for each of said valves, each of said switch mechanisms being responsive to the opening and closing of the respective valve, said switch mechanisms being wired in series beginning with the stack valve switch mechanism and ending with the top air valve switch mechanism, said switch mechanisms and said wiring being such that for any acceptable combination a closed circuit is made from the stack valve switch mechanism to the top air valve switch mechanism while said circuit is open if any unacceptable combination is set up, indicator means connected to the stack valve switch mechanism and to the top air valve switch mechanism to signal the existence of an unacceptable combination, and a timer wired to the bottom air valve switch mechanism to start the timer when said valve closes and to stop the timer when said valve opens, said timer being connected to said indicator to produce a signal if said valve does not open a predetermined length of time after it closes.

6. For use with a hydrogen generator having a plurality of control valves which are opened and closed in a plurality of acceptable combinations during an operating cycle, a device to determine the existence of an acceptable combination including a switch mechanism for each of said valves, said switch mechanisms being wired in series with two external connections thereto, said switch mechanisms and wiring being adapted to form four electrical paths between said connections, the setting of the switch mechanisms for each path corresponding to an acceptable combination of valves with one path corresponding to two acceptable combinations, and timer means responsive to the opening and closing of one valve during consecutive cycles of operation to determine whether said valve has operated to change from one to the other of said two acceptable combinations.

7. For use with a hydrogen generator having a plurality of control valves which are opened and closed in a plurality of acceptable combinations during an operating cycle, an electrically controlled indicator means having two external connections thereto and a plurality of switch mechanisms, each switch mechanism being responsive to one of said valves, said switch mechanisms being wired in series between said connections and forming four closed acceptable circuits between said two connections, each of said four closed circuits corresponding to an acceptable combination, said four circuits being such that malfunction of one valve and malpositioning of the corresponding switch mechanism will produce an open circuit between said two connections.

8. A hydrogen generator including a steam valve, a hydrogen valve, a purge valve, a bottom air valve, a top air valve, a blue gas valve, and a stack valve, power actuated means to operate said valves in a given sequence through a series of acceptable combinations to produce an operating cycle, a switch mechanism for each of said valves, each of said switch mechanisms being responsive to the opening and closing of the respective valve, said switch mechanisms being wired in series to form a closed series circuit therethrough when said valves are positioned in any acceptable combination and to form an open circuit when said valves are in any unacceptable combination, and means to indicate whether said circuit is closed or open and to incapacitate said power actuated means in the event said circuit remains open for more than a predetermined length of time.

References Cited in the file of this patent
UNITED STATES PATENTS

| Number | Name | Date |
|---|---|---|
| 1,184,692 | Shaw | May 23, 1916 |
| 1,434,072 | Taussig | Oct. 31, 1922 |
| 2,389,204 | Ludi et al. | Nov. 20, 1945 |
| 2,554,549 | Albert et al. | May 29, 1951 |